United States Patent
Hata

(10) Patent No.: US 11,057,598 B2
(45) Date of Patent: Jul. 6, 2021

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Tetsuya Hata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/546,450

(22) Filed: Aug. 21, 2019

(65) Prior Publication Data
US 2020/0077067 A1    Mar. 5, 2020

(30) Foreign Application Priority Data
Aug. 29, 2018    (JP) .............................. JP2018-160601

(51) Int. Cl.
*H04N 5/225*    (2006.01)
*H04N 9/64*    (2006.01)
*H04N 9/04*    (2006.01)

(52) U.S. Cl.
CPC ............... *H04N 9/646* (2013.01); *H04N 9/04* (2013.01)

(58) Field of Classification Search
CPC .................................................... H04N 9/646
See application file for complete search history.

(56) References Cited

U.S. PATENT DOCUMENTS

| 2003/0035069 A1* | 2/2003 | Fukui ....................... H04N 9/68 348/679 |
| 2004/0091145 A1* | 5/2004 | Kohashi ................. H04N 9/646 382/162 |
| 2005/0220337 A1* | 10/2005 | Arazaki ................. H04N 9/045 382/162 |
| 2006/0012808 A1* | 1/2006 | Mizukura .......... H04N 9/04557 358/1.9 |
| 2006/0066735 A1* | 3/2006 | Hirai ..................... H04N 9/646 348/241 |

(Continued)

FOREIGN PATENT DOCUMENTS

JP    3919389 B    5/2007
JP    2007-311895 A    11/2007

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

A first tone correction unit generates a second image signal by applying, to a first image signal, first tone correction processing conforming to a first tone correction characteristic. A second tone correction unit generates a fourth image signal by applying, to a third image signal, second tone correction processing conforming to a second tone correction characteristic. A generation unit generates a fifth image signal by compositing a luminance component of the second image signal and a color difference component of the fourth image signal. A first tone conversion unit generates a sixth image signal by applying, to the fifth image signal, first tone conversion processing conforming to a non-linear first tone conversion characteristic. The second tone correction characteristic is determined based on the first tone correction characteristic and a non-linear second tone conversion characteristic.

11 Claims, 6 Drawing Sheets

(56) References Cited

U.S. PATENT DOCUMENTS

| | | | | |
|---|---|---|---|---|
| 2007/0236715 A1* | 10/2007 | Hashimoto | ............ | H04N 9/735 |
| | | | | 358/1.9 |
| 2009/0052797 A1* | 2/2009 | Matsushita | ........ | H04N 9/04557 |
| | | | | 382/260 |
| 2009/0153699 A1* | 6/2009 | Satoh | ................ | H04N 5/35581 |
| | | | | 348/229.1 |
| 2009/0160992 A1* | 6/2009 | Inaba | ................ | H04N 9/04557 |
| | | | | 348/308 |

* cited by examiner

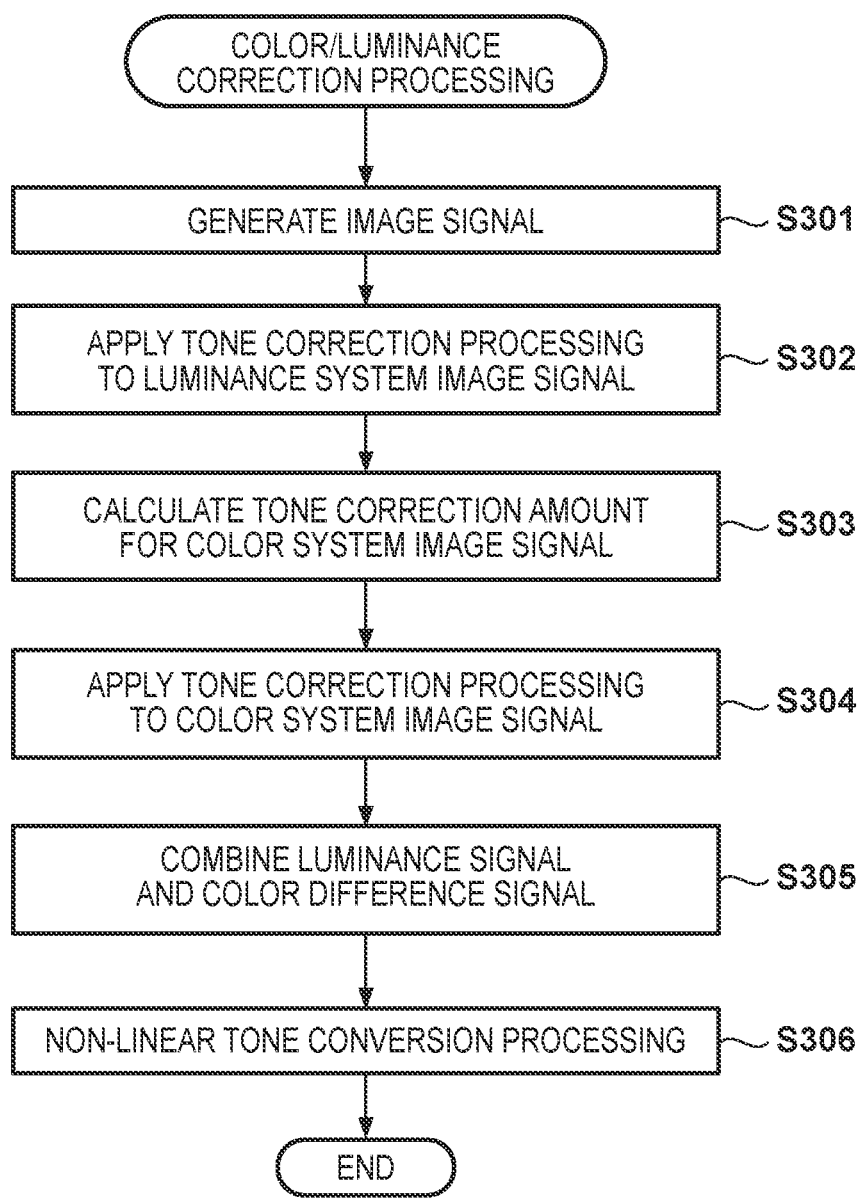

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Regarding image processing inside a camera, it has been suggested that image processing for a color signal and image processing for a luminance signal be optimized separately from each other. For example, Japanese Patent No. 3919389 discloses a technique to, in a configuration that performs non-linear tone conversion processing (gamma correction) for a color signal and non-linear tone conversion processing for a luminance signal separately from each other, optimize the number of bits in each tone conversion processing.

Furthermore, regarding image processing inside a camera, it has been suggested that tone correction be performed for favorable image creation in a stage prior to non-linear tone conversion processing. For example, Japanese Patent Laid-Open No. 2007-311895 discloses a technique to perform tone correction for adjusting the brightness of an image to a desired level in a stage prior to non-linear tone conversion processing.

A configuration may be plausible in which, based on the techniques of Japanese Patent No. 3919389 and Japanese Patent Laid-Open No. 2007-311895, tone correction for image creation with respect to a color signal and tone correction for image creation with respect to a luminance signal are performed separately from each other, and then non-linear tone conversion processing is performed after combining the color signal and the luminance signal following the tone correction. In this way, the tone correction for image creation with respect to each of the color signal and the luminance signal and the non-linear tone conversion processing can be executed separately from each other, thereby facilitating control of the tone correction.

However, in the foregoing configuration, depending on the characteristic of a gamma curve of the non-linear tone conversion processing in a later stage, the influence of the tone correction for the luminance signal may affect not only the luminance signal, but also the color signal, following the non-linear tone conversion processing. As a result, there is a possibility that an output image does not exhibit desired color reproduction.

As one example, assume a case where processing for adding a certain value to an input signal is performed to brighten an image in tone correction for a luminance signal in a stage prior to gamma correction. In this case, an input signal level with respect to gamma correction processing in a later stage rises. In general, a gamma curve used in gamma correction in a camera has a characteristic whereby the higher an input signal level, the smaller the inclination of the gamma curve. Therefore, when tone correction for a luminance signal has caused a rise in an input signal level with respect to gamma correction in a later stage, a difference between color signals (color difference) following the application of the gamma correction decreases. As a result, the color of an image becomes light.

SUMMARY OF THE INVENTION

The present invention has been made in view of the aforementioned situation. The present invention provides a technique to, in a configuration that applies non-linear tone conversion processing to an image signal generated from a luminance component and a color difference component that have undergone different types of tone correction processing, effectively control the color difference component of the image signal that has undergone the non-linear tone conversion processing.

According to a first aspect of the present invention, there is provided an image processing apparatus comprising at least one processor and/or at least one circuit which function as: a first tone correction unit configured to generate a second image signal by applying, to a first image signal, first tone correction processing conforming to a first tone correction characteristic; a determination unit configured to determine a second tone correction characteristic; a second tone correction unit configured to generate a fourth image signal by applying, to a third image signal, second tone correction processing conforming to the second tone correction characteristic; a generation unit configured to generate a fifth image signal by compositing a luminance component of the second image signal and a color difference component of the fourth image signal; and a first tone conversion unit configured to generate a sixth image signal by applying, to the fifth image signal, first tone conversion processing conforming to a non-linear first tone conversion characteristic, wherein the determination unit determines the second tone correction characteristic based on the first tone correction characteristic and a non-linear second tone conversion characteristic.

According to a second aspect of the present invention, there is provided an image capturing apparatus, comprising: the image processing apparatus according to the first aspect; and at least one processor and/or at least one circuit which function as an image capturing unit configured to generate the first image signal and the third image signal.

According to a third aspect of the present invention, there is provided an image processing method executed by an image processing apparatus, comprising: generating a second image signal by applying, to a first image signal, first tone correction processing conforming to a first tone correction characteristic; determining a second tone correction characteristic; generating a fourth image signal by applying, to a third image signal, second tone correction processing conforming to the second tone correction characteristic; generating a fifth image signal by compositing a luminance component of the second image signal and a color difference component of the fourth image signal; and generating a sixth image signal by applying, to the fifth image signal, first tone conversion processing conforming to a non-linear first tone conversion characteristic, wherein the second tone correction characteristic is determined based on the first tone correction characteristic and a non-linear second tone conversion characteristic.

According to a fourth aspect of the present invention, there is provided a non-transitory computer-readable storage medium which stores a program for causing a computer to execute an image processing method comprising: generating a second image signal by applying, to a first image signal, first tone correction processing conforming to a first tone correction characteristic; determining a second tone correction characteristic; generating a fourth image signal by applying, to a third image signal, second tone correction processing conforming to the second tone correction characteristic; generating a fifth image signal by compositing a luminance component of the second image signal and a color difference component of the fourth image signal; and generating a sixth image signal by applying, to the fifth image signal, first tone conversion processing conforming to a non-linear first tone conversion characteristic, wherein the second tone correction characteristic is determined based on the first tone correction characteristic and a non-linear second tone conversion characteristic.

Further features of the present invention will become apparent from the following description of exemplary embodiments with reference to the attached drawings.

BRIEF DESCRIPTION OF THE DRAWINGS

FIG. 3 is a flowchart of the color/luminance correction processing executed by the image processing unit 105 according to the first embodiment.

DESCRIPTION OF THE EMBODIMENTS

Figure 1:
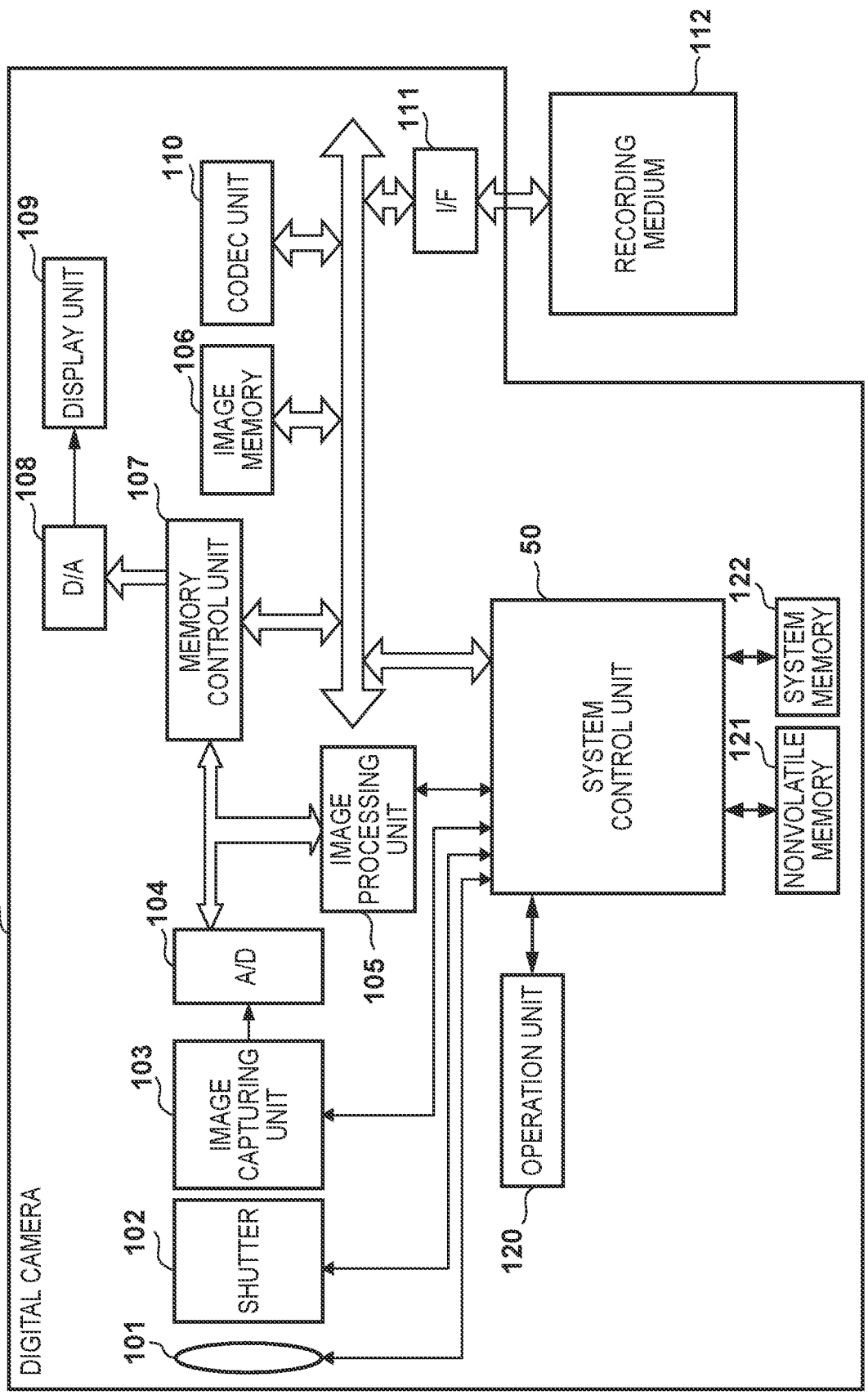
FIG. 1 is a block diagram showing a configuration of a digital camera 100.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

FIG. 1 is a block diagram showing a configuration of a digital camera 100, which is one example of an image processing apparatus. In FIG. 1, a lens assembly 101 includes a focusing lens and a zoom lens. A shutter 102 having a diaphragm function is arranged between the lens assembly 101 and an image capturing unit 103. The image capturing unit 103 includes an image sensor, such as a CCD or CMOS image sensor, that converts an optical image formed by the lens assembly 101 on an image capturing surface into an electrical signal on a pixel-by-pixel basis. An A/D converter 104 converts an analog signal output from the image capturing unit 103 into a digital signal (image data).

An image processing unit 105 performs various types of image processing, such as color interpolation (demosaicing), white balance adjustment, and γ correction, with respect to image data output from the A/D converter 104. Furthermore, as will be described later, the image processing unit 105 is configured to perform processing independently with respect to each of a color signal and a luminance signal. An image memory 106 temporarily stores image data. A memory control unit 107 controls reading and writing involving the image memory 106. A D/A converter 108 converts image data into an analog signal. A display unit 109 includes a display apparatus, such as an LCD and an organic EL display, and displays various types of GUIs, live-view images, images that have been read out from a recording medium 112 and reproduced, and the like. A codec unit 110 encodes image data stored in the image memory 106 using a preset method in order to record the image data into a recording medium, and decodes encoded image data contained in an image file for display purpose and the like.

An I/F 111 (interface) mechanically and electrically connects the attachable/removable recording medium 112, such as a semiconductor memory card and a card-shaped hard disk, for example, to the digital camera 100. A system control unit 50 may be a programmable processor, such as a CPU and an MPU, for example. The system control unit 50 realizes the functions of the digital camera 100 by controlling necessary blocks and circuits through the execution of programs recorded in, for example, a nonvolatile memory 121.

The nonvolatile memory 121 may be, for example, an electrically erasable and recordable EEPROM and the like. Various types of setting values and GUI data are recorded in the nonvolatile memory 121. Furthermore, in a case where the system control unit 50 is an MPU or a CPU, programs to be executed by the system control unit 50 are recorded in the nonvolatile memory 121. A system memory 122 is used in deploying constants and variables for the operations of the system control unit 50, programs that have been read out from the nonvolatile memory 121, and the like.

An operation unit 120 is a block that collectively presents input devices, such as buttons and switches, that are intended for a user to input various types of instructions to the digital camera 100. In a case where the display unit 109 is a touch display, a touchscreen is included in the operation unit 120. In addition, an input device with which an instruction is input in a contactless manner using sound input, eye tracking input, and the like may be included in the operation unit 120.

Next, a description is given of basic operations in the digital camera 100 configured in the above-described manner at the time of shooting a subject. The image capturing unit 103 photoelectrically converts a subject image, which is formed by the lens assembly 101 on the image capturing surface while the shutter 102 is open, with use of the image sensor, and outputs the resultant subject image as an analog image signal to the A/D converter 104. The A/D converter 104 converts the analog image signal output from the image capturing unit 103 into a digital image signal (image data), and outputs the digital image signal to the image processing unit 105.

The image processing unit 105 performs various types of image processing, such as synchronization processing (demosaicing processing) and γ correction, with respect to image data from the A/D converter 104 or image data from the memory control unit 107. Furthermore, the image processing unit 105 performs predetermined computation processing related to luminance, contrast, and the like using image data obtained through the shooting. The system control unit 50 performs focus adjustment (AF) and exposure control (AE) based on the obtained computation result.

Image data output from the image processing unit 105 is written to the image memory 106 via the memory control unit 107. The image memory 106 stores image data output from the image capturing unit 103, and image data to be displayed on the display unit 109.

The D/A converter 108 converts data for image display, which is stored in the image memory 106, into an analog signal and supplies the analog signal to the display unit 109. The display unit 109 causes the display apparatus (e.g., an LCD) to perform display in accordance with the analog signal from the D/A converter 108.

The codec unit 110 encodes image data recorded in the image memory 106 based on the standard of JPEG or MPEG, for example. The system control unit 50 creates an image file by appending a preset header and the like to the encoded image data, and records the image file into the recording medium 112 via the I/F 111.

Note that the digital camera 100 may be configured to cause the display unit 109 to function as an electronic viewfinder (EVF) by shooting moving images and continuously displaying the shot moving images on the display unit 109 in a shooting standby state. In this case, the digital camera 100 places the shutter 102 in an open state in the shooting standby state, and performs shooting at, for example, 30 frames per second using a so-called electronic shutter of the image capturing unit 103. When a shutter button included in the operation unit 120 is pressed halfway down, the aforementioned AF and AE are controlled, and when the shutter button is fully pressed down, still image shooting for recording purpose is executed through actual shooting, and a still image is recorded into the recording medium 112. On the other hand, when an instruction for shooting moving images is issued using a moving image shooting button and the like, the digital camera 100 starts recording of moving images into the recording medium 112.

Figure 2:
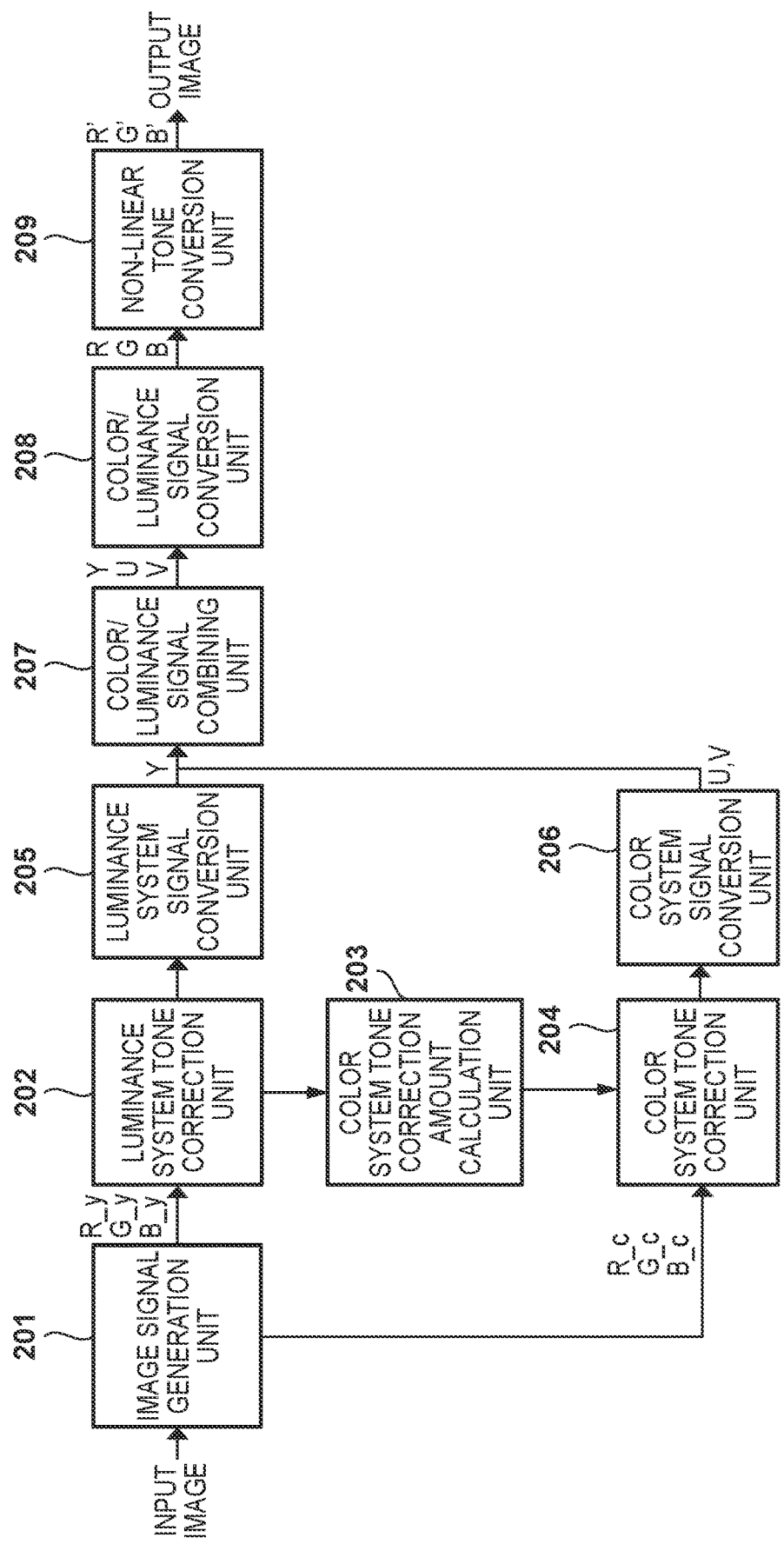
FIG. 2 is a block diagram showing the functions of an image processing unit 105 related to color/luminance correction processing according to a first embodiment.

FIG. 2 is a block diagram showing the functions of the image processing unit 105 related to color/luminance correction processing according to the first embodiment. The image processing unit 105 includes an image signal generation unit 201, a luminance system tone correction unit 202, a color system tone correction amount calculation unit 203, a color system tone correction unit 204, and a luminance system signal conversion unit 205. The image processing unit 105 also includes a color system signal conversion unit 206, a color/luminance signal combining unit 207, a color/luminance signal conversion unit 208, and a non-linear tone conversion unit 209. Note that one or more of the functional blocks shown in FIG. 2 may be realized by a combination of a microprocessor and software, and may be realized by hardware, such as an ASIC (Application Specific Integrated Circuit) and a PLD (Programmable Logic Device). Examples of the PLD include an FPGA (Field-Programmable Gate Array) and a PLA (Programmable Logic Array).

Next, with reference to FIG. 3, a description is given of the flow of the color/luminance correction processing executed by the image processing unit 105 according to the first embodiment. In step S301, the image signal generation unit 201 performs synchronization processing (demosaicing processing) with respect to an input image signal that has information of one color (one of R, G, B) per pixel, thereby generating an image signal in which each pixel has information of three colors (RGB). The input image signal is, for example, an image signal generated by the image capturing unit 103. The image signal generation unit 201 outputs the generated image signal to the luminance system tone correction unit 202 as a luminance system image signal (R_y, G_y, B_y), and to the color system tone correction unit 204 as a color system image signal (R_c, G_c, B_c).

Note that the luminance system image signal and the color system image signal may be the same image signal, or may be different image signals. In the latter case, the image signal generation unit 201 can generate the luminance system image signal and the color system image signal as different image signals by applying different types of image processing to an image signal generated from the same input image signal. Alternatively, the image signal generation unit 201 may use different image signals generated from different input image signals as the luminance system image signal and the color system image signal, respectively.

In step S302, the luminance system tone correction unit 202 applies tone correction processing to the luminance system image signal (R_y, G_y, B_y) so that the luminance system image signal has a favorable luminance tone characteristic. The luminance system tone correction unit 202 outputs the image signal generated through the tone correction processing to the luminance system signal conversion unit 205. The luminance system signal conversion unit 205 calculates a luminance signal (Y) by multiplying each color component of the input image signal by a predetermined conversion coefficient and then summing the resultant products. Furthermore, the luminance system tone correction unit 202 outputs, to the color system tone correction amount calculation unit 203, information related to the characteristic of the tone correction processing that has been applied to the luminance system image signal (tone correction characteristic). Note that this tone correction characteristic for the luminance system image signal may be any characteristic. For example, the luminance system tone correction unit 202 may apply the tone correction processing to the luminance system image signal in conformity with a preset tone correction characteristic. Alternatively, the luminance system tone correction unit 202 may evaluate the brightness, contrast, and the like of the luminance system image signal, and determine the tone correction characteristic based on the evaluation result. Alternatively, it is permissible to adopt a configuration in which the tone correction characteristic is determined as the brightness, luminance contrast, and the like are determined by the user. In this case, as the color system tone correction amount calculation unit 203 calculates an appropriate correction amount for the color system image signal in accordance with the tone correction characteristic determined by the user, the user need not set the tone correction characteristic for both of the luminance signal and the color signal, and an operation can be performed easily and conveniently.

Furthermore, although the above tone correction processing has been described as being applied to the RGB signal, it is permissible to adopt a configuration in which the RGB signal is converted into the luminance signal Y and then the tone correction processing is performed with respect to the luminance signal Y. Alternatively, it is permissible to adopt a configuration in which processing for adding a predetermined gain or offset to the luminance system image signal is performed as the tone correction processing.

In step S303, the color system tone correction amount calculation unit 203 calculates a tone correction amount for the color system image signal based on the tone correction characteristic that was input from the luminance system tone correction unit 202 in step S302. A calculation method used here will be described later in detail. The color system tone correction amount calculation unit 203 determines the tone correction characteristic for the color system image signal based on the calculated tone correction amount. The color system tone correction amount calculation unit 203 outputs information related to the determined tone correction characteristic to the color system tone correction unit 204.

In step S304, the color system tone correction unit 204 applies tone correction processing to the color system image signal (R_c, G_c, B_c) based on the tone correction characteristic input from the color system tone correction amount calculation unit 203. The details of this tone correction processing will be described later. The color system tone correction unit 204 outputs the image signal generated through the tone correction processing to the color system signal conversion unit 206. The color system signal conversion unit 206 calculates a color difference signal (U, V) by multiplying each color component of the input image signal by a predetermined conversion coefficient and then summing the resultant products. Furthermore, the color system tone correction unit 204 also performs tone correction processing for image creation so that the color system image signal has a favorable color tone characteristic, in addition to the tone correction processing conforming to the tone correction characteristic determined by the color system tone correction amount calculation unit 203. Any characteristic may be used as this characteristic of the tone correction processing for image creation with respect to the color system image signal. For example, the color system tone correction unit 204 may apply the tone correction processing in conformity with a preset tone correction characteristic. Alternatively, the color system tone correction unit 204 may evaluate the saturation and the like of the color system image signal, and determine the tone correction characteristic based on the evaluation result. Alternatively, it is permissible to adopt a configuration that uses a tone correction characteristic designated by the user.

Note that in step S303, the color system tone correction amount calculation unit 203 may determine the tone correction characteristic for the color system tone correction unit 204 in consideration of the characteristic of the tone correction processing for image creation with respect to the color system image signal in addition to the characteristic of the luminance system tone correction processing. In this case, in step S304, it is sufficient for the color system tone correction unit 204 to merely perform tone correction processing conforming to the tone correction characteristic input from the color system tone correction amount calculation unit 203 as the tone correction processing. That is, the color system tone correction unit 204 no longer needs to additionally perform the tone correction processing for image creation.

In step S305, the color/luminance signal combining unit 207 generates an image signal (Y, U, V) by combining (compositing) the luminance signal Y (luminance component) calculated by the luminance system signal conversion unit 205 and the color difference signal U, V (color difference component) calculated by the color system signal conversion unit 206. The color/luminance signal combining unit 207 outputs the generated image signal to the color/luminance signal conversion unit 208.

In step S306, the color/luminance signal conversion unit 208 multiplies the input image signal (Y, U, V) by a predetermined conversion coefficient and then sums the resultant products, thereby converting the image signal from a YUV format to an RGB format. The color/luminance signal conversion unit 208 outputs the image signal (R, G, B) after the conversion to the non-linear tone conversion unit 209. The non-linear tone conversion unit 209 performs gamma correction (tone conversion processing) with respect to the input image signal (R, G, B) in conformity with a preset non-linear characteristic (tone conversion characteristic), and outputs the image signal after the gamma correction (R', G', B'). Note that the non-linear tone conversion unit 209 may convert the image signal from the RGB format to the YUV format by multiplying the image signal after the gamma correction (R', G', B') by a predetermined coefficient and then summing the resultant products. In this case, the non-linear tone conversion unit 209 outputs an image signal of the YUV format.

Figure 4A:
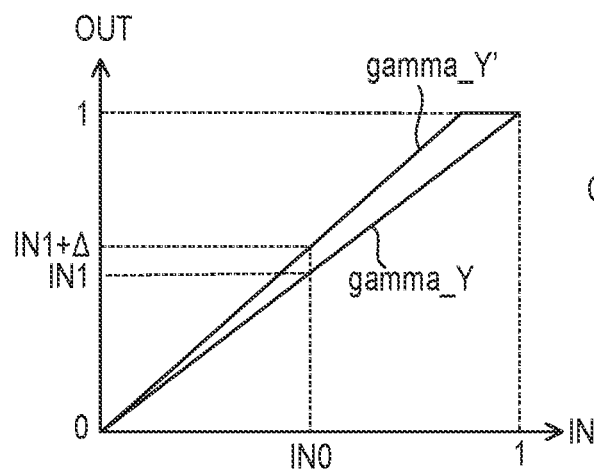
FIGS. 4A to 4E are diagrams for describing the details of processing of steps S302 to S304 in FIG. 3.

Next, with reference to FIGS. 4A to 4E, the details of processing of steps S302 to S304 in FIG. 3 will be described. FIG. 4A is a conceptual diagram showing the characteristic of the tone correction processing that is performed by the luminance system tone correction unit 202 with respect to the luminance system image signal in step S302. In FIG. 4A, a horizontal axis of a graph indicates the input signal to the luminance system tone correction unit 202. Here, among the three components of the luminance system image signal (R_y, G_y B_y), a green color component (G_y) is denoted by IN0 as a representative value. However, a luminance component calculated from the luminance system image signal (the luminance signal Y) may be used as the representative value. A vertical axis of the graph indicates the output signal of the luminance system tone correction unit 202. The output of the luminance system tone correction unit 202 is denoted by IN1 and the like because the output corresponds to the input signal with respect to later-described non-linear tone conversion processing that is used in calculation of a tone correction amount for the color system image signal.

Furthermore, in the figure, gamma_Y represents the characteristic for a case where tone correction is not performed, whereas gamma_Y' represents one example of the characteristic for a case where tone correction is performed. The following description will be given using an exemplary case in which tone correction for increasing the contrast of luminance by increasing the inclination of a curve indicating the tone correction characteristic (a tone curve) is performed, as shown in the figure. In this case, the output signal corresponding to the input signal IN0 increases by Δ and becomes IN1+Δ as a result of performing the tone correction. Although the tone correction characteristics are depicted by straight lines here, tone correction characteristics indicated by tone curves having a shape of a curved line may be used.

Figure 4B:
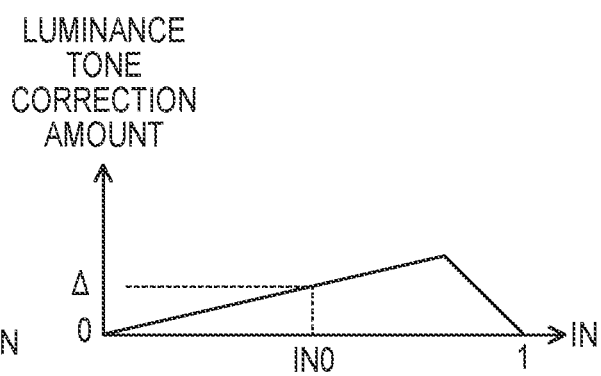

The luminance system tone correction unit 202 outputs information of the tone correction characteristic (here, a luminance tone correction amount as a specific example) to the color system tone correction amount calculation unit 203. FIG. 4B is a conceptual diagram of a luminance tone correction amount for each input signal level.

Figure 4C:
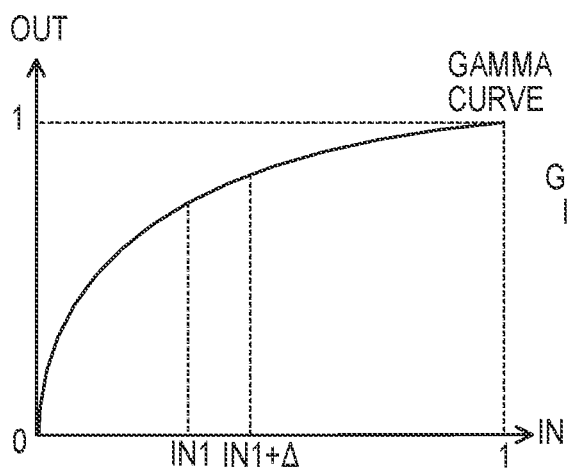
Figure 4D:
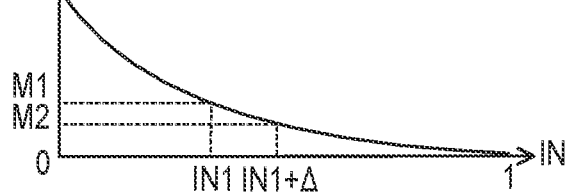
Figure 4E:
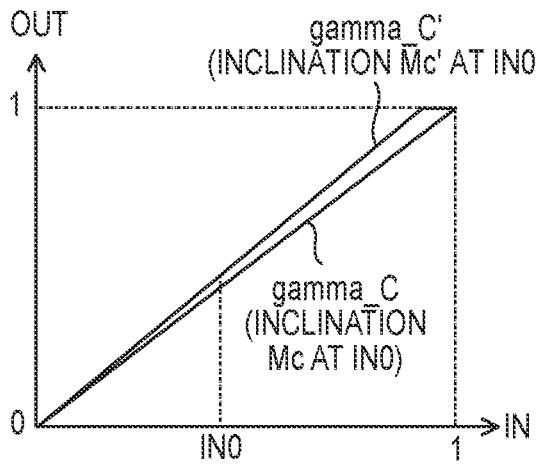

Next, FIGS. 4C to 4E are conceptual diagrams for describing processing that is performed by the color system tone correction amount calculation unit 203 to calculate a tone correction amount for the color system image signal in step S303. FIGS. 4C and 4D are diagrams showing the characteristic of the non-linear tone conversion processing that is intended to determine the tone correction characteristic for the color system image signal. It will be assumed here that a tone curve (gamma curve) indicating the characteristic of the tone conversion processing performed by the non-linear tone conversion unit 209 is used. In FIG. 4C, a horizontal axis and a vertical axis of a graph respectively indicate an input image signal and an output image signal with respect to the non-linear tone conversion processing. In FIG. 4D, a horizontal axis and a vertical axis of a graph respectively indicate the input image signal and a value of the inclination of a tone curve (gamma curve) with respect to the non-linear tone conversion processing.

The color system tone correction amount calculation unit 203 calculates a tone correction amount for the color system image signal based on a value of the inclination of the gamma curve shown in FIG. 4D. Specifically, the following processing is performed.

First, the color system tone correction amount calculation unit 203 calculates an inclination M1 of the gamma curve at a position corresponding to a value (IN1) of the input signal for the case where the tone correction is not performed with respect to the luminance system image signal. Next, the color system tone correction amount calculation unit 203 calculates an inclination M2 of the gamma curve at a position corresponding to a value (IN1+Δ) of the input signal for the case where the tone correction is performed with respect to the luminance system image signal. Here, when Δ has a positive value, the relationship (inclination M2)<(inclination M1) is satisfied. Note that the inclination of the gamma curve corresponds to the magnitude of a difference between color signals following the gamma correction (color difference). Therefore, a change in the inclination of the gamma curve corresponding to the same input signal IN0 from M1 to a smaller value, M2, as a result of the tone correction for the luminance system image signal means a reduction in color difference.

Next, with reference to FIG. 4E, a description is given of a method of determining the tone correction characteristic for the color system image signal from the calculated inclination. FIG. 4E shows the tone correction characteristic in the color system tone correction unit 204, and a horizontal axis and a vertical axis of a graph respectively indicate an input image signal and an output image signal with respect to the color system tone correction unit 204. Also, in the figure, gamma_C represents one example of the tone correction characteristic for the color system image signal, whereas gamma_C' represents the tone correction characteristic that is determined by the color system tone correction amount calculation unit 203 based on gamma_C. Furthermore, Mc and Mc' represent the inclinations of gamma_C and gamma_C' corresponding to the input signal IN0. The color system tone correction amount calculation unit 203 determines the tone correction characteristic (inclination Mc') based on the following expression.

$$Mc'=Mc\times(M1/M2)$$

The above expression is used for the following reason. The inclination M1 and the inclination M2 respectively represent the inclination of the gamma curve corresponding to the case where the tone correction is not performed with respect to the luminance system image signal, and the inclination of the gamma curve corresponding to the case where the tone correction is performed with respect to the luminance system image signal, and satisfy the relationship M2<M1. Therefore, multiplying Mc by the ratio (M1/M2) means that the tone correction is performed with respect to the color system image signal so as to cancel out the characteristic change in the color difference component following the gamma correction attributed to the tone correction performed with respect to the luminance system image signal. In this way, control can be performed so as to reduce the influence of the tone correction for the luminance system image signal on the color difference component of the image signal following the gamma correction, and so as to bring color reproduction of an image to a desired state.

The color system tone correction amount calculation unit 203 calculates the inclination using the relationship of the above expression, determines the characteristic of gamma_C', and outputs information of the same to the color system tone correction unit 204. Although the relationship Mc<Mc' is satisfied in the examples of FIGS. 4A to 4E because the tone correction amount A for the luminance system image signal has been described to have a positive value, the relationship Mc'<Mc is satisfied when the tone correction amount A has a negative value. In step S304, the color system tone correction unit 204 applies the tone correction processing to the color system image signal in conformity with the characteristic of gamma_C'.

As described above, the color system tone correction amount calculation unit 203 determines the tone correction characteristic for the color system tone correction unit 204 based on a difference between the inclination M1 and the inclination M2. More specifically, the color system tone correction amount calculation unit 203 can determine a tone curve (gamma_C') having the inclination Mc' obtained by multiplying the inclination Mc of a predetermined tone curve (gamma_C) by M1/M2 as the tone correction characteristic for the color system tone correction unit 204.

Although the above has described a configuration that calculates the tone correction amount for the color system image signal corresponding to the input signal IN0, the present embodiment is not limited to this configuration. For example, it is permissible to adopt a configuration that calculates, in advance, color system tone correction amounts corresponding to respective signal levels of the input signal, and the characteristic of the tone correction curve gamma_C' for the color system image signal, and performs tone correction with respect to the color system image signal in conformity with the characteristic that has been calculated in advance when the image signal is input.

Furthermore, although the above has described a configuration that calculates the tone correction amount for the color system image signal based on the inclination of the gamma curve in a later stage, the present embodiment is not limited to this configuration. For example, it is permissible to adopt a configuration that calculates a signal value following the application of gamma correction in a later stage with respect to each of input image signals of the RGB format, and calculates a difference therebetween (color difference). In this case, it is sufficient for the color system tone correction amount calculation unit 203 to obtain an amount of change in a color difference component depending on whether the tone correction is performed with respect to the luminance system image signal, and determine the tone correction amount for the color system image signal so as to cancel out that change.

In a more generalized explanation, the color system tone correction amount calculation unit 203 determines the tone correction characteristic for the color system tone correction unit 204 so as to cancel out a difference of a color difference component of an image signal obtained through the application of the tone conversion processing by the non-linear tone conversion unit 209 to a seventh image signal relative to a color difference component of an image signal obtained through the application of the tone conversion processing by the non-linear tone conversion unit 209 to an eighth image signal. Here, the seventh image signal is an image signal generated by the color/luminance signal combining unit 207 in a case where the luminance system tone correction unit 202 has performed the tone correction and the color system tone correction unit 204 has performed the tone correction conforming to a predetermined tone correction characteristic. On the other hand, the eighth image signal is an image signal generated by the color/luminance signal combining unit 207 in a case where the luminance system tone correction unit 202 has not performed the tone correction and the color system tone correction unit 204 has performed the tone correction conforming to a predetermined tone correction characteristic. Therefore, the difference between the aforementioned two color difference components is based on the tone correction characteristic of the luminance system tone correction unit 202. That is, the color system tone correction amount calculation unit 203 determines the tone correction characteristic for the color system tone correction unit 204 so as to cancel out a difference between color difference components of image signals that have undergone the tone conversion processing of the non-linear tone conversion unit 209 depending on whether the luminance system tone correction unit 202 performs the tone correction.

As described above, according to the first embodiment, the digital camera 100 controls the tone correction characteristic for the color system image signal in a configuration that applies non-linear tone conversion processing to an image signal generated from a luminance component and a color difference component that have undergone different types of tone correction processing. Specifically, the digital camera 100 determines the tone correction characteristic for the color system image signal based on the tone correction characteristic for the luminance system image signal and the characteristic of the non-linear tone conversion processing (non-linear tone conversion characteristic). This makes it possible to control the influence of a signal level fluctuation attributed to the tone correction for the luminance system image signal on the color difference component of the image signal that has undergone the non-linear tone conversion processing, and reduce deterioration in the image quality.

Although the above has described a configuration in which tone conversion processing conforming to a tone curve is used for the RGB signal as the tone correction processing for the color system image signal, the present embodiment is not limited to this configuration. For example, the tone correction processing executed by the color system tone correction unit 204 may be processing for applying a gain to a color difference component of the color system image signal (target image signal). In this case, the color system tone correction unit 204 may convert the color system image signal from the RGB format to the YUV format, and then apply the gain (saturation gain) to the color difference component (U, V signal). In this case, the color system tone correction amount calculation unit 203 determines the saturation gain (tone correction characteristic) based on a difference between the obtained inclinations M1 and M2 (for example, the ratio (M1/M2)). That is, any configuration may be adopted as long as the configuration controls the tone correction characteristic for the color system image signal based on the tone correction characteristic for the luminance system image signal and the characteristic of the non-linear tone conversion processing (non-linear tone conversion characteristic).

Second Embodiment

In the first embodiment, the color system tone correction amount calculation unit 203 determines the tone correction characteristic for the color system tone correction unit 204 with reference to the tone conversion characteristic of the non-linear tone conversion unit 209. The description of a second embodiment pertains to a configuration in which the color system tone correction amount calculation unit 203 determines the tone correction characteristic for the color system tone correction unit 204 with reference to a non-linear tone conversion characteristic that is different from the tone conversion characteristic of the non-linear tone conversion unit 209. In the present embodiment, the fundamental configuration of the digital camera 100 is similar to that of the first embodiment (see FIG. 1). The following mainly describes the differences from the first embodiment.

Figure 5:
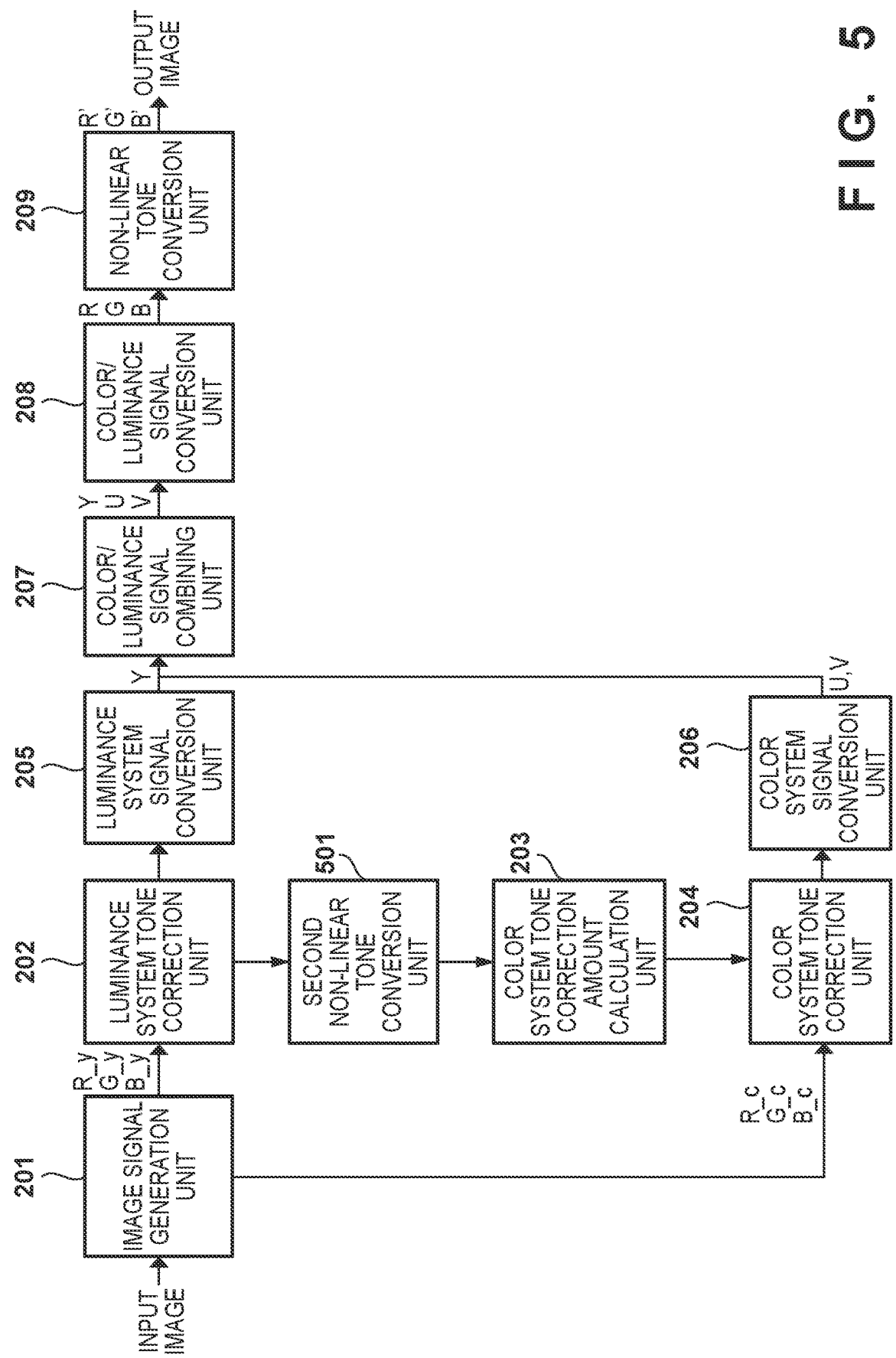
FIG. 5 is a block diagram showing the functions of the image processing unit 105 related to color/luminance correction processing according to a second embodiment.

FIG. 5 is a block diagram showing the functions related to color/luminance correction processing of the image processing unit 105 according to the second embodiment. In contrast to the image processing unit 105 according to the first embodiment (FIG. 2), the image processing unit 105 according to the second embodiment additionally includes a second non-linear tone conversion unit 501.

The color/luminance correction processing executed by the image processing unit 105 in the present embodiment is similar to that of the first embodiment (see FIG. 3), but processing in step S303 differs from that of the first embodiment.

Figure 6A:
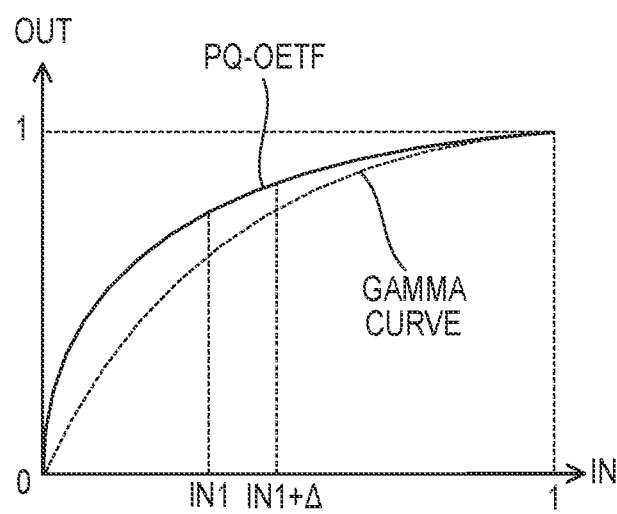
FIGS. 6A and 6B are diagrams for describing processing for calculating a tone correction amount according to the second embodiment.
Figure 6B:
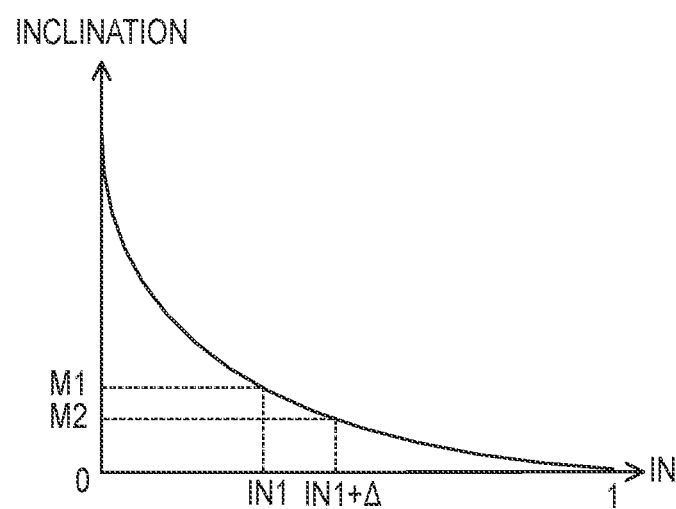

FIGS. 6A and 6B are diagrams for describing processing for calculating a tone correction amount according to the second embodiment. FIG. 6A corresponds to FIG. 4C according to the first embodiment, and a horizontal axis and a vertical axis of a graph respectively indicate an input image signal and an output image signal with respect to the second non-linear tone conversion unit 501. Furthermore, a solid line in the figure indicates the characteristic of tone conversion in the second non-linear tone conversion unit 501 (non-linear tone conversion characteristic), whereas a dotted line in the figure indicates the characteristic of tone conversion in the non-linear tone conversion unit 209 in a later stage (non-linear tone conversion characteristic). Here, the tone conversion characteristic of the second non-linear tone conversion unit 501 has been set based on the PQ-OETF characteristic set by SMPTE ST.2084. On the other hand, the tone conversion characteristic of the non-linear tone conversion unit 209 has been set based on a signal processing system used by the digital camera 100; for example, it has been set based on the HLG-OETF characteristic set by SMPTE ST.2084. Here, the reason why the tone correction characteristic of the color system tone correction unit 204 is determined based on the PQ-OETF characteristic in the present embodiment is because the PQ-OETF characteristic represents a model of a non-linear characteristic in visual performances of humans. This makes it possible to control the tone correction characteristic for the color system image signal based on visual performances at the time of viewing of an output image displayed on a monitor.

FIG. 6B corresponds to FIG. 4D according to the first embodiment, and a horizontal axis and a vertical axis of a graph respectively indicate an input image signal and a value of the inclination of a tone curve (gamma curve) with respect to the second non-linear tone conversion unit 501.

In the present embodiment, the color system tone correction amount calculation unit 203 calculates a tone correction amount for the color system image signal based on the PQ-OETF characteristic shown in FIG. 6B. A specific calculation method is similar to that in the case of the first embodiment, except that the gamma curve to be referred to is different.

As described above, according to the second embodiment, the color system tone correction amount calculation unit 203 determines the tone correction characteristic for the color system tone correction unit 204 with reference to a non-linear tone conversion characteristic (e.g., the PQ-OETF characteristic) that is different from the tone conversion characteristic of the non-linear tone conversion unit 209. In this way, in a configuration that applies non-linear tone conversion processing to an image signal generated from a luminance component and a color difference component that have undergone different types of tone correction processing, the color difference component of the image signal that has undergone the non-linear tone conversion processing can be effectively controlled.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-160601, filed Aug. 29, 2018 which is hereby incorporated by reference herein in its entirety.

What is claimed is:

1. An image processing apparatus comprising at least one processor and/or at least one circuit which function as:
    a first tone correction unit configured to generate a second image signal by applying, to a first image signal, first tone correction processing conforming to a first tone correction characteristic;
    a determination unit configured to determine a second tone correction characteristic;
    a second tone correction unit configured to generate a fourth image signal by applying, to a third image signal, second tone correction processing conforming to the second tone correction characteristic;
    a generation unit configured to generate a fifth image signal by compositing a luminance component of the second image signal and a color difference component of the fourth image signal; and
    a first tone conversion unit configured to generate a sixth image signal by applying, to the fifth image signal, first tone conversion processing conforming to a non-linear first tone conversion characteristic,
    wherein the determination unit determines the second tone correction characteristic based on the first tone correction characteristic and a non-linear second tone conversion characteristic.

2. The image processing apparatus according to claim 1, wherein
    the determination unit determines the second tone correction characteristic so as to cancel out a difference of a color difference component of an image signal obtained by applying, to a seventh image signal, second tone conversion processing conforming to the second tone conversion characteristic relative to a color difference component of an image signal obtained by applying the second tone conversion processing to an eighth image signal,
    the seventh image signal is an image signal obtained by compositing the luminance component of the second image signal and a color difference component of an image signal obtained by applying, to the third image signal, predetermined tone correction processing conforming to a predetermined tone correction characteristic, and
    the eighth image signal is an image signal obtained by compositing a luminance component of the first image signal and the color difference component of the image signal obtained by applying the predetermined tone correction processing to the third image signal.

3. The image processing apparatus according to claim 1, wherein
    the determination unit determines the second tone correction characteristic based on a difference between a first inclination of a tone curve indicating the second tone conversion characteristic at a position corresponding to a value of a predetermined component of the first image signal and a second inclination of the tone curve indicating the second tone conversion characteristic at a position corresponding to a value of the predetermined component of the second image signal.

4. The image processing apparatus according to claim 3, wherein
    the predetermined component is a green color component or a luminance component.

5. The image processing apparatus according to claim 3, wherein
    the second tone correction processing is tone conversion processing conforming to a tone curve, and
    the determination unit determines, as the second tone correction characteristic, a tone curve having an inclination obtained by multiplying an inclination of a predetermined tone curve by
    (the first inclination)/(the second inclination).

6. The image processing apparatus according to claim 3, wherein
    the second tone correction processing is processing for applying a gain to a color difference component of a target image signal, and
    the determination unit determines, as the second tone correction characteristic, a gain based on a difference between the first inclination and the second inclination.

7. The image processing apparatus according to claim 1, wherein
    the first tone conversion characteristic and the second tone conversion characteristic are same tone conversion characteristic.

8. The image processing apparatus according to claim 1, wherein
the first image signal and the third image signal are same image signal.

9. An image capturing apparatus, comprising:
the image processing apparatus according to claim 1; and
at least one processor and/or at least one circuit which function as an image capturing unit configured to generate the first image signal and the third image signal.

10. An image processing method executed by an image processing apparatus, comprising:
generating a second image signal by applying, to a first image signal, first tone correction processing conforming to a first tone correction characteristic;
determining a second tone correction characteristic;
generating a fourth image signal by applying, to a third image signal, second tone correction processing conforming to the second tone correction characteristic;
generating a fifth image signal by compositing a luminance component of the second image signal and a color difference component of the fourth image signal; and
generating a sixth image signal by applying, to the fifth image signal, first tone conversion processing conforming to a non-linear first tone conversion characteristic,
wherein the second tone correction characteristic is determined based on the first tone correction characteristic and a non-linear second tone conversion characteristic.

11. A non-transitory computer-readable storage medium which stores a program for causing a computer to execute an image processing method comprising:
generating a second image signal by applying, to a first image signal, first tone correction processing conforming to a first tone correction characteristic;
determining a second tone correction characteristic;
generating a fourth image signal by applying, to a third image signal, second tone correction processing conforming to the second tone correction characteristic;
generating a fifth image signal by compositing a luminance component of the second image signal and a color difference component of the fourth image signal; and
generating a sixth image signal by applying, to the fifth image signal, first tone conversion processing conforming to a non-linear first tone conversion characteristic,
wherein the second tone correction characteristic is determined based on the first tone correction characteristic and a non-linear second tone conversion characteristic.

* * * * *